Nov. 11, 1924.
D. S. LANDSTRA
1,515,125
APPARATUS FOR MOLDING PLASTIC MATERIALS
Original Filed Oct. 5, 1918
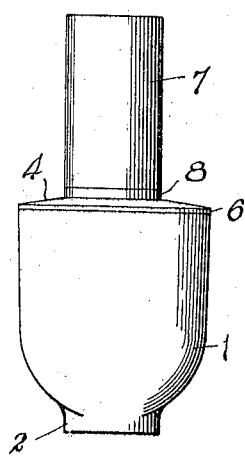
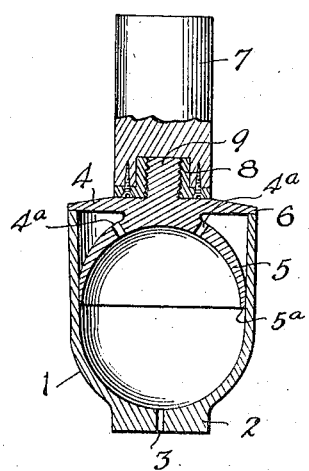
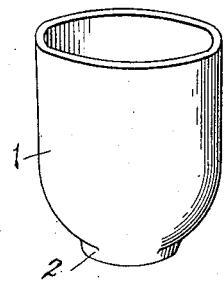
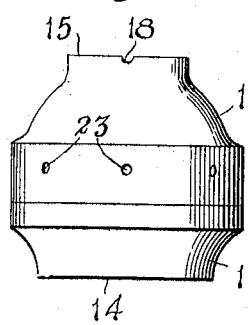
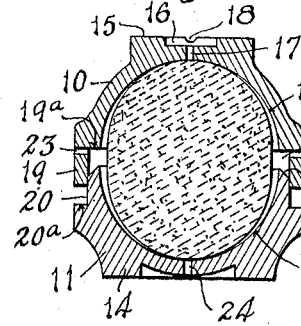
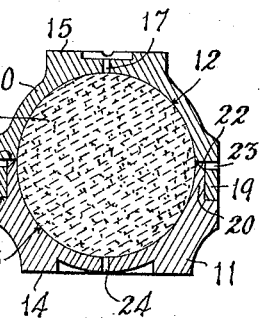
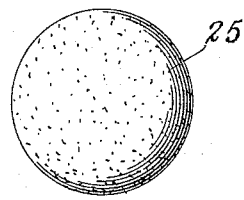
INVENTOR
Dirk S. Landstra
BY
Everett & Rook
ATTORNEYS Patented Nov. 11, 1924.

1,515,125

UNITED STATES PATENT OFFICE.

DIRK S. LANDSTRA, OF SOUTH ORANGE, NEW JERSEY.

APPARATUS FOR MOLDING PLASTIC MATERIALS.

Original application filed October 5, 1918, Serial No. 256,932. Divided and this application filed March 31, 1920. Serial No. 370,133.

*To all whom it may concern:*

Be it known that I, DIRK S. LANDSTRA, a citizen of the United States, and a resident of South Orange, in the county of Essex and State of New Jersey, have invented new and useful Improvements in Apparatus for Molding Plastic Materials, of which the following is a specification.

This application is a division of my co-pending application, filed October 5, 1918, Serial No. 256,932, and relates in general to apparatus for molding plastic materials and more particularly to apparatus for molding cement balls, such as are used in filtration plants and the like.

The objects of the invention are to provide an apparatus of the class described which will produce accurate and uniform articles of plastic materials; to provide such an apparatus in which each of the articles formed therein will be molded under uniform pressure to secure solid homogeneous articles; to provide a molding apparatus comprising two concave mold members having a telescoping engagement with each other to provide a mold cavity between them; to provide means for limiting the telescoping action of said mold members to always provide a mold cavity of the same size; to provide a molding apparatus both ends of which are provided with impact receiving surfaces whereby the plastic material is molded under pressure; to secure novel construction for allowing the escape of air and moisture from the mold; to provide novel apparatus for molding solid and homogeneous cement balls which will stand hard usage, severe blows or pressure without cracking or breaking; to secure apparatus by means of which plastic articles can be molded with great rapidity, and to obtain other results and advantages as may be brought out by the following description.

Referring to the accompanying drawings, in which like numerals of reference indicate the same parts throughout the several views, Figure 1 is a side elevation of the forming mold which is first employed in carrying out my invention;

Figure 2 is a central vertical section of the same;

Figure 3 is a perspective view of the lower or cup portion of the same;

Figure 4 is a side elevation of the shaping dies which are employed in finishing my improved balls;

Figure 5 is a central vertical section of the same with a ball inside as it comes from the forming mold and showing the shaping dies ready to be forced together;

Figure 6 is a similar section with the dies forced together, and the ball compressed into final shape, and Figure 7 is a perspective view of a ball made by my improved method and means.

In the specific embodiment of the invention set forth in said drawings, which shows an apparatus formed for the molding of spheres or balls, 1 indicates a cup-like forming mold which is adapted to stand upon any suitable support, such as a bench or the like, by means of a base 2 in which I have shown an air-vent hole 3. The lower half of the chamber of this mold 1 is semi-spherical or approximately of the shape desired to be given the balls, but of a smaller radius than that desired in the finished ball, while the upper part is cylindrical and forms a guideway for a plunger or cooperative forming member 4. Preferably this upper cylindrical portion has a very slight flare, sufficient to afford clearance in removing the upper member 4 and also the oblong ball which is formed in the mold as hereinafter described.

This plunger 4 has a lower approximately semi-spherical portion 5 adapted to slidably and telescopically enter the upper cylindrical part of the mold 1, said semi-spherical portion 5 being of substantially the same radius as the lower portion of the mold 1, and above said portion 5 is a flange or stop 6 adapted to engage the end of the mold 1 and limit entrance of the plunger member thereinto. The edge of said semi-spherical portion 5 is sharpened or narrowed at $5^a$ to snugly engage the inner wall of the member 1 to scrape the plastic material from said inner wall of the member 1 and guide the material into the semi-spherical portion 5. Preferably said stop 6 is so positioned as that the chamber formed by the mold and plunger will be somewhat elongated rather than exactly spherical and so mold a prolate spheroid. I have shown the plunger member 4 provided with a handle 7 of wood with a socket or bushing 8 to receive a threaded stem 9 on the lower middle portion, but obviously this construction could be varied as desired. Air vent holes $4^a$ are provided in the plunger member 4 to allow escape of air from the forming mold.

The shaping dies shown in Figures 4, 5 and 6 comprise upper and lower members 10 and 11 chambered at 12 and 13 respectively so as to form a sphere when pressed together, the radii of the said chambers 12 and 13 being substantially equal and the same as the radius of the desired ball. The lower die member 11 has a base 14 for standing upon a suitable bed and the upper die 10 has a top 15 adapted to receive the blows of a drop hammer. Preferably this top is centrally recessed as at 16 and provided with a vent 17 from its interior chamber and other lateral vents 18 leading to the atmosphere, so that when struck by the drop hammer the air can escape from the interior chamber and no air will trap in the recess 16.

The upper die member 10 has a flange 19 which slides down over an inner flange 20 on the lower die member at their plane of joining and these flanges are long enough so that they engage when the die members are loosely put together with an elongated ball of cement therein, as shown in Figure 5. Under the blow of the drop hammer, the two die members come together as shown in Figure 6 the shoulders 19ª and 20ª at the inner ends of the flanges 19 and 20 engaging the outer end of the opposite flanges to limit the telescoping action of the dies, and preferably, for the escape of surplus material and the formation of smooth sides, the upper edge of the flange 20 of the lower die member is tapered inwardly as at 21 to a sharp edge, leaving an annular space 22 of triangular cross-section to receive any material which is forced out of the die chamber and cut off by the sharp edge. Furthermore vent holes 23 are provided opening from said annular space 22 through the flange 19 of the upper die member. There is also a vent 24 at the bottom of the lower die member.

In forming cement balls by my improved method, a suitable quantity of cement is first placed in the forming mold 1 and then the plunger 4 brought down on it, preferably with a blow or two of a mallet or the like, to set the stop 6 on the edges of the walls of the mold. The plunger member is then removed and the cement taken out in the form of an elongated ball or prolate spheroid such as shown in Figure 5. This elongated ball is then placed between the shaping dies 10 and 11, with its major axis vertical, as shown in Figure 5, and the dies are placed under a drop hammer. To make three inch balls, about two blows of a thirty-five pound hammer with a drop of six inches are sufficient to bring the upper and lower dies together, as shown in Figure 6, and form a perfect ball 25.

The die members are then separated, the ball taken out and any slight fin or line at the joint of the dies rubbed off with the hands, after which the balls are laid on a soft bed of sand to dry.

It will be understood that while I have described my invention with reference to the manufacture of cement balls, articles of other shapes can also be made according to my method and with my apparatus, by changes in the form of the apparatus employed which would involve only mechanical skill, and the invention can be applied to any other plastic material than cement for which it may be found suitable.

Having thus described the invention, what I claim is:

In an apparatus for molding articles of plastic material, the combination of upper and lower mold members one having its edge portion cut away outwardly to form a thin inner edge and the other having a flange depending over the said edge portion of the first-mentioned mold member and forming with said thin inner edge thereof an annular chamber for surplus material, said flange having vent holes through its base or portion farthest from its free edge, whereby the said annular chamber for surplus material is vented at its extreme top.

DIRK S. LANDSTRA.